United States Patent [19]
Magnotta

[11] Patent Number: 4,536,434
[45] Date of Patent: Aug. 20, 1985

[54] HEAT TRANSFER LAMINATE

[75] Inventor: Frank A. Magnotta, Framingham, Mass.

[73] Assignee: Dennison Manufacturing Co., Framingham, Mass.

[21] Appl. No.: 544,024

[22] Filed: Oct. 20, 1983

[51] Int. Cl.$^3$ .......................... B32B 7/06; B32B 7/10; C09J 7/02

[52] U.S. Cl. .................................... 428/200; 156/230; 428/201; 428/202; 428/211; 428/348; 428/349; 428/352; 428/354; 428/355; 428/488.4; 428/913; 428/914

[58] Field of Search ................. 428/200, 202, 40, 201, 428/347, 913, 211, 488.1, 488.4, 349, 348, 352, 354, 355, 914; 156/230, 234

[56] References Cited

U.S. PATENT DOCUMENTS 2,862,832 12/1958 Shepherd ........................ 428/347 X
2,989,413 6/1961 Shepherd ........................ 428/200
2,990,311 6/1961 Shepherd ........................ 156/234
3,516,842 6/1970 Klinker et al. ........................ 428/40
3,616,015 10/1971 Kingston ........................ 156/230
3,616,176 10/1971 Jachimowicz ........................ 428/200

*Primary Examiner*—Thomas J. Herbert
*Attorney, Agent, or Firm*—Barry D. Josephs

[57] ABSTRACT

An improved nonglossy release formulation for use in a heat transferable laminate wherein an ink design image is transferred from a carrier support to an article by application of heat to the carrier support. The improved release enhances anchorage of the ink design image while maintaining the required degree of release during transfer to an article. The improved release prevents image distortion during heat transfer to the article and provides the transferred image with a transparent, nonglossy, abrasion and corrosion resistant protective coating. The improved release is composed of a paraffin wax and a binder adhesion-promoting resin composed of a mono-olefin/vinylacetate/acrylic acid terpolymer or a mono-olefin/ethyl acrylate copolymer.

20 Claims, 3 Drawing Figures

HEAT TRANSFER LAMINATE

BACKGROUND OF THE INVENTION

1. Field of the Invention

The present invention relates to a heat transferable label and improved release composition therefor.

2. Description of the Prior Art

Prior art heat transferable labels for imprinting designs onto an article typically involve decorative laminates consisting of a paper base sheet or web coated with a wax or polymeric release layer over which a design is imprinted in ink.

U.S. Pat. No. 3,616,015 is illustrative of the prior art. In U.S. Pat. No. 3,616,015 a label-carrying web such as a paper sheet includes a heat transferable label composed of a wax release layer affixed to a surface of the paper sheet and an ink design layer superimposed onto the wax release layer. In the heat transfer labelling process for imprinting designs onto articles, the label-carrying web is subjected to heat, and the laminate is pressed onto an article with the ink design layer making direct contact with the article. As the web or paper sheet is subjected to heat, the wax layer begins to melt so that the paper sheet can be released from the wax layer. After transfer of the design to the article, the paper sheet is immediately removed, leaving the design firmly affixed to the surface with the wax layer exposed to the environment. The wax release layer should not only permit release of the transferable label from the web upon application of heat to the web but also form a clear, protective layer over the transferred ink design.

This commonly assigned patent discloses a wax release coating containing a modified montan wax which has been oxidized, esterfied, and partially saponified. Paraffin wax, microcrystalline wax, and a rosin ester are included in the wax blend along with the montan wax. In order to attain improved clarity of the transferred ink design, the transferred wax coating over the ink design is subjected to additional heat processing after the label has been transferred onto an article. The additional processing involves postflaming, wherein the transferred wax coating is subjected to jets of high temperature gas either as direct gas flame or as hot air jets at temperatures of about 300° F. to 400° F. for a period of time sufficient to remelt the wax coating without substantially heating the bottle. Upon cooling of the remelted wax coating through use of ambient or forced cooled air, the cooled wax layer solidifies to form a clear, smooth, glossy, protective coating over the transferred ink design. Since the release coating disclosed in this reference produces a glossy, protective coating over the transferred ink design, the release composition disclosed therein is not suitable when the transferred image is desired to have a nonglossy, matte appearance. Also, the release disclosed in U.S. Pat. No. 3,616,015 may exhibit a degree of hazing noticeable over the transferred label when the transfer is made onto clear plastic materials. U.S. Pat. No. 3,616,015 is herein incorporated by reference.

U.S. Pat. No. 3,516,842 discloses a heat transfer label which is heat transferable from a paper carrier sheet to a plastic bottle. This reference discloses a wax-like release layer which may be composed of any one of three compositions: (I) the release disclosed may be composed of a slightly oxidized, low molecular weight polyethylene wax (col. 2, line 65 to col. 3, line 3); or (II) the release layer may be of an unoxidized hard wax, which wax after deposition on the paper carrier has been subjected to corona discharge (col. 3, lines 4–13); or (III) the release layer may be a blend of ethylenevinylacetate (EVA) copolymer and a paraffin wax (col. 3, lines 14–21). These release compositions do not provide sufficient adhesive properties to uniformly bond the ink design layer or intermediate lacquer coating which may be included between the release layer and ink design layer. The above release compositions do not exhibit the required high degree of film integrity during the heat transfer of the print image to the receiving article. Lack of sufficient film integrity results in shrinkage of the release layer during transfer and distortion of the transferred image.

U.S. Pat. No. 2,989,413 discloses a heat transferable laminate employing a release layer composed of an unoxidized Fisher-Tropsch wax. The unoxidized wax is employed as a release layer without incorporation of other wax or resin additive. The use of unoxidized waxes alone in release coatings for heat transferable laminates has proved to be unsatisfactory. Ink is apt to migrate into the wax upon printing and part of the ink layer may split on transfer. Also, unoxidized wax alone does not exhibit sufficient adhesive properties to uniformly bond the ink design or intermediate lacquer coating to the release surface.

U.S. Pat. No. 2,990,311 discloses a heat transferable decal having a release transfer layer composed of a mixture of a crystalline wax and a synthetic thermoplastic film-forming resin, principally an organic linear thermoplastic film-forming resin which is substantially water insoluble. The degree of compatibility of the resin and wax is controlled through selection and ratio of the components to give heat transfers of either the hot-peel or cold-peel type. In the hot-peel transfer, the decal will adhere and release from the backing only immediately after application while the decal is still hot. In the cold-peel transfer, the transferred decal will adhere to the receiving surface when hot but will only release and transfer by peeling away the backing after the transfer has cooled. In either type of transfer, this reference teaches that resins and waxes (the latter being used for the release layer) should be mutually incompatible or insoluble at temperatures below the melting temperature of the wax such that the molten wax, upon cooling, will actually crystallize separately and distinctly from the resin.

Suitable resins specifically disclosed are polyvinyl acetate, polyethyl acrylate, polymethyl acrylate, polyethyl methacrylate, polypropyl methacrylate, polybutyl methacrylate, styrenebutadiene, acrylonitrile-butadiene, polychloroprene rubbers, polyvinyl butyral, ethyl cellulose, and polyvinyl acetate vinyl stearate copolymer (col. 5, lines 38–44). The reference teaches that the wax component should be a material which derives its crystallinity mainly from the presence of long hydrocarbon chains, and should melt over a relatively narrow range between the temperatures of about 50° C. to 110° C. The penetrometer hardness value (ASTM D5-52) when tested with 100 grams for 5 seconds at 28° C. should be below about 15. Specific waxes disclosed as suitable are beeswax, candelilla wax, carnauba wax, hydrogenated castor oil, montan wax, paraffin wax, low molecular weight polyethylene, oxidized microcrystalline wax, and hard wax or derivatives thereof obtained from the Fischer Tropsch synthesis. (col. 5, lines 45–56). This reference does not disclose applicant's formulation for the release layer nor does it contemplate the advantages which applicant has derived from such formulation.

U.S. Pat. No. 2,862,832 discloses a heat transferable decal having a release layer composed of an oxidized wax. The disclosure is directed principally to defining the type of wax found to provide suitable release of the decal from the carrier web upon application of heat. The wax disclosed in this reference is an oxidized wax obtained as the reaction product of the oxidation of hard, high melting, aliphatic, hydrocarbon waxes. The oxidized waxes are defined as the oxidation products of both natural and synthetic hydrocarbon waxes such as petroleum waxes, low molecular weight polyethylene and waxes obtained from the Fischer-Tropsch synthesis. Suitable waxes may include oxidized microcrystalline wax or the esterification product of an oxidized hydrocarbon wax. The oxidized waxes are disclosed as those having melting points between about 50° C. and 110° C., saponification values between about 25 and 100, acid values between about 5 and 40, and penetrometer hardness (ASTM D5-52) below about 51 as measured with 100 grams for 5 seconds at 25° C. This reference does not disclose applicant's release formulation nor does it recognize or contemplate the advantages obtained from such formulation.

U.S. Pat. No. 3,616,176 discloses a heat transfer laminate of a type related to that disclosed in U.S. Pat. No. 3,616,015. In U.S. Pat. No. 3,616,176 the laminate is composed of a base sheet, with a polyamide layer covering the base sheet and a decorative ink layer covering the polyamide layer. Sufficient heat is applied to the laminate to heat the polyamide layer at or above a softening point, and the laminate is then pressed onto the surface of an article with the decorative ink layer coming into direct contact. Upon withdrawal of the heat source, the polyamide layer cools to a temperature below the softening point and the base sheet is removed. The decorative layer becomes fused or heat sealed to the article. The polyamide layer in this disclosure functions as a release coating which allows transfer of the decorative layer onto an article and upon cooling serves as a protective coating layer over the transferred decorative layer. The use of a polyamide release coating has the principal disadvantage in that there is a significant tendency for the polyamide to form a noticeable halo around the transferred decorative layer. Also, the polyamide layer even when subjected to additional processing such as post-flaming does not form a sufficiently clear coating that would aesthetically permit heat transfer labelling onto clear articles or bottles.

Accordingly, it is an object of the present invention to provide an improved release for heat transferable substrates which permits transfer of an ink design image from a support member to an article, such as a plastic bottle, and produces a nonglossy protective coating over the transferred ink design image.

It is an important object of the invention to provide an improved release for heat transferable substrates wherein the release exhibits improved anchorage for the ink design layer without sacrifice in release properties during heat transfer.

It is another object to provide an improved release which effects heat transfer of an ink design image to an article without distorting the image during transfer.

SUMMARY OF THE INVENTION

In accomplishing the foregoing and related objects, the invention provides a heat transferable laminate having an improved release composition. The heat transferable laminate is typically affixed to a carrier web, such as paper or a plastic sheet. The transferable laminate is composed of a release layer coated on the carrier web, an ink design layer, and an optional adhesive coating over the ink design. As heat and pressure are applied to the laminate in contact with an article, such as a glass or plastic container, the release layer softens allowing the laminate which contains the decorative ink design to transfer onto the article to be decorated. The release coating remains with the laminate, forming a transparent, matte, nonglossy, protective coating over the transferred ink design layer after the release layer resolidifies. The transferred laminate may be subjected to post-flaming to improve the smoothness of the transferred release coating which forms the protective coating.

The improved release formulation provides a matte, nonglossy, transparent, protective coating over the transferred ink design image. The matte, nonglossy finish is particularly desirable in decorating many plastic articles such as plastic bottles or containers which have a colored or opaque appearance. The improved release has the advantage of enhancing anchorage of the ink design image thereto while maintaining the required degree of release during transfer to an article. The release formulation permits transfer of the laminate to an article at transfer temperatures preferably between about 300° F. to 600° F., and short contact times of less than 1 or 2 seconds, typically about 0.1 second. The improved release additionally alleviates an array of problems often associated with prior art nonglossy heat transferable release coatings. The present release formulation reduces the chance of "coating crawl" for subsequent coatings, such as the ink design coating. The present release prevents "peeling" of any of the coatings during unwind of the laminate prior to use. During heat transfer of the laminate to the article being decorated, the improved release has the additional important property of preventing "film shrinkage" and thereby preventing distortion of the transferred image. The release additionally provides a uniform abrasion and corrosion resistent protective coating over the transferred ink design.

The improved release is a hot melt composed of a paraffin wax, a binder adhesion-promoting resin, and a modifier resin. The binder adhesion-promoting resin and modifier resin in liquid phase are clear and transparent, each having a Gardner Color Index of between about 0.5 and 4, typically about 1 (ASTM D-1544). The improved hot melt release has a drop melting point between about 85° C. to 135° C., more preferably a drop melting point between about 95° C. to 105° C. A preferred class of binder adhesion-promoting resin is selected from the class of terpolymers composed of a mono-olefin/vinylacetate/acrylic acid terpolymer, in particular ethylene/vinylacetate/acrylic acid terpolymer. Another preferred class of binder adhesion-promoting resin is selected from the class of mono-olefin/ethylacrylate copolymer, and in particular ethylene/ethylacrylate copolymer. The acrylic acid (or acrylate formed therefrom) may be replaced with higher homologs of acrylic acid. The higher homologs preferably include unsaturated carboxylic acids having a carbon content between about $C_3$ to $C_5$, particularly monounsaturated carboxylic acids having a carbon content between about $C_3$ to $C_5$. Also, higher homologs of vinylacetate, in particular allyl acetate, may be a substitute monomer for the vinylacetate monomer in the monoolefin/vinylacetate/acrylic acid terpolymer.

A preferred modifier resin is advantageously selected from the class of viscosity-modifier resins selected from polymers of α-olefins. Another preferred viscosity-modifier resin is a low molecular weight polyethylene resin, which is a nonoxidized polyethylene homopolymer having a molecular weight less than 10,000, preferably less than about 5,000.

The paraffin wax component is composed of linear, saturated hydrocarbon, typically having a melting point between about 110° F. to 175° F. The preferred paraffin wax component is composed of linear, saturated hydrocarbons ranging from about $C_{26}H_{54}$ to $C_{32}H_{66}$, having a melting point between about 145° F. to 175°. The paraffin wax may be present in the release layer typically between about 10 to 50 percent by weight. The weight ratio of the binder adhesion-promoting resins to paraffin wax is preferably between about 0.5/1 to 2/1.

DETAILED DESCRIPTION

Figure 1:
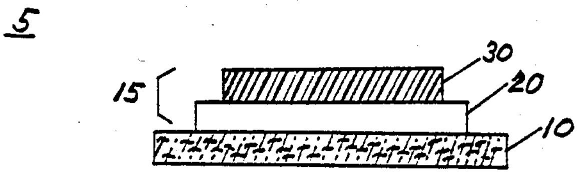
FIG. 1 is an illustration of a preferred embodiment of the composite heat transferable laminate.
Figure 2:
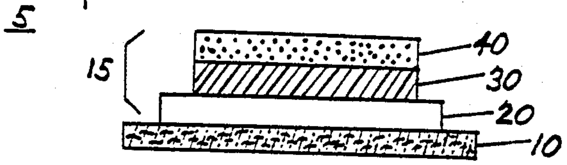
FIG. 2 is an illustration of another preferred embodiment of the composite heat transferable laminate with adhesive coating layer.
Figure 3:
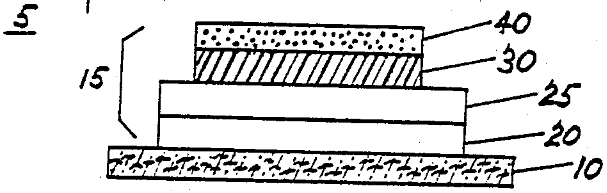
FIG. 3 is an illustration of an embodiment of the composite heat transferable laminate with optional intermediate layers.

A preferred embodiment of the heat transferable laminate 5 of the invention as illustrated in FIG. 1 is composed of a carrier web 10, typically paper overcoated with a release layer 20 and ink design layer 30. It is more preferable to overcoat ink design layer 30 with an adhesive layer 40 as illustrated in FIGS. 2 and 3. It is also preferable to include a barrier coating layer 25 between release layer 20 and the ink design layer 30, as best illustrated in FIG. 3. Release layer 20 and ink design layer 30 together with the optional barrier layer 25 and adhesive coating 40 form a transferable substrate 15, which releases from carrier web 10 upon application of heat to web 10 sufficient to melt release layer 20. As an article or surface is pressed onto the exposed surface of substrate 15, it splits from carrier web 10 and transfers onto the surface of the article with ink design layer 30 clearly imprinted on the article.

Substrate 15, which includes ink design layer 30 is transferred from carrier 10 onto a nonfibrous receiving article, such as a plastic or glass bottle. Substrate 15 is transferred, typically by rolling pressure, from a conventional heated surface, such as a heated platen or hot roller, which presses against the exposed surface of paper web 10, while ink design layer 30 or adhesive layer 40 is in contact with the receiving article. The hot platen or roller is heated to a temperature sufficient to tackify ink layer 30 if an adhesive layer is not employed, or else sufficient to tackify adhesive layer 40 if such layer is included, and simultaneously sufficient to melt release layer 20. The platen or roller is heated to a temperature between about 300° F. to 600° F., preferably between about 300° to 450° F., more preferably between about 350° F. to 400° F. The contact time of the heated platen on carrier 10 is of very short duration to permit continual high speed production of labelled articles. The contact time of the heated platen to effect transfer of substrate 15 to an article is less than 1 or 2 seconds, and typically about 0.1 second or somewhat less. Carrier web 10, typically of paper, is then removed from release layer 20. Substrate 15 remains in permanent contact with the article with ink design 30 forming the transferred image on the surface of the article. During transfer, release layer 20 splits from the carrier forming a uniform protective coating over transferred ink design layer 30. If a barrier layer 25 is employed as in FIG. 3, release layer 20 similarly leaves a uniform protective coating over the transferred barrier layer 25 as substrate 15 is transferred onto the receiving article. After the ink design layer 30 has been transferred onto the receiving article, it is preferable to subject the transferred substrate 15 to a postheating or postflaming step. Although optional, the postheating step is preferably employed to enhance the appearance of the transferred image 30 on the receiving article. The step removes microscopic hills and valleys from the surface of transferred release coating 20, thus forming an extremely smooth, protective coating over the transferred design image. In the postflaming step, transferred substrate 15, including transferred wax release layer 20, is typically exposed to jets of hot gas, either as a direct gas flame or hot air jets for a brief period. Hot air, hot gas, or infrared heating between about 400° F. and 3,000° F. may be employed in this step, but combustive gas having a flame temperature between about 1,000° F. and 3,000° is preferred. The postflaming step needs only be of up to several seconds duration, and is preferably less than about 1 or 2 seconds, typically less than about 0.15 seconds when a flame temperature between about 1,000° F. and 3,000° F. is employed. This period of time is sufficient to melt the transferred release layer 20, forming an extremely smooth, protective coating over the transferred ink design layer 30, yet without causing surface distortion to the receiving article. The short duration for effecting the postflaming together with the short contact time during the preceeding transfer step permits high speed production of decorated articles. The postflaming step may be carried out in a manner set forth in U.S. Pat. No. 3,616,015.

In applying heat transferable laminate 5 to a receiving article in the above-described manner, it must be appreciated that release layer 20 must satisfy a number of requirements simultaneously. Release layer 20 must be easily coated onto carrier web 10 when the release is in a molten state. Release layer 20 must have the required physical properties that prevent "pickoff" problems from occurring; that is, without causing removal of a portion of release layer 20 when barrier coating 25 or ink design coating 30 is coated thereon. The release formulation (coating 20) forms a matte, nonglossy, transparent, protective coating over the design image transferred onto an article. A matte, nonglossy finish is desired in decorating many plastic articles, such as plastic bottles or containers, which are nontransparent, particularly those having a colored or opaque appearance. Release coating 20 is not limited to transfer onto any particular polymer classes of plastic articles to be decorated. Illustrative examples of plastic articles to be decorated which have an opaque appearance may typically be of polyethylene, polypropylene, polybutene, polyimide, impact polystyrene, ABS plastic, acetal resin, impact acrylic, and 66 nylon. Prior art release formulations which yield a nonglossy, matte appearance after transfer to an article typically contain a blend of a paraffin wax with an oxidized polyethylene resin. It has been extremely difficult heretofore to uniformly coat an ink design layer or barrier layer over such prior art wax-based release coatings without developing "coating crawl". Coating crawl occurs when a coating such as ink design layer or intermediate barrier lacquer does not adhere or anchor sufficiently to the surface of the release layer. This results in a nonuniform coating having microscopic hills and valleys on its surface. The formulation of the present invention for release layer 20 has overcome the so-called "crawl" problem by providing release layer 20 with improved adhesive-bonding properties for conventional ink and barrier-lacquer coating employed in heat transferable laminates. This has been accomplished without sacrifice in the required release properties that release 20 must exhibit during transfer. Another serious problem which the present formulation for release 20 overcomes is that of "shrinkage" of substrate 15 during transfer onto a receiving article. Prior art wax-based release coating formulations yielding a matte, nonglossy appearance on transfer, particularly conventional wax-based formulations employing blends of paraffin wax and oxidized polyethylene resin have a tendency to shrink during transfer onto a receiving article, resulting in image distortion. The formulation of the present invention for release coating 20 has solved this long-standing prior art problem associated with nonglossy, wax-based release coatings. Release 20 after transfer to an article must also provide the ink design layer 30 with sufficient abrasion or scuff resistance and must protect the transferred ink design image from exposure to water or water-vapor environments. Release coating 20 must also be corrosion resistant to chemicals such as alcohol, essential oils, perfumes, and detergents often contained in bottles to be decorated.

Another serious problem associated with prior art nonglossy release formulations for heat transferable laminates is that of coating "peel", which is apt to occur during unwind of the laminate roll prior to use. For example, it is conventional to store heat transferable lamintes 5 by rolling the laminates such that adhesive layer 40 contacts the back surface of carrier 10, thus forming a windup roll. The "peel" phenomenon occurs with prior art release coatings as a result of the release coating having insufficient anchorage or adhesive bonding properties for the overcoated ink design layer or intermediate barrier coating layer. In such cases with prior art release formulations, there is a tendency during unwind for portions of the design coating or barrier coating to peel, that is, separate in portions from the release layer. The improved formulation of the present invention for heat release coating 20 has greatly reduced the chance of "peel" by increasing adhesive bonding properties of release 20 for the ink design 30 or intermediate barrier coating 25 thereon.

In practice it is difficult to find a formulation for release coating 20 which overcomes any one of the above-mentioned problems without exacerbating the other problems and adversely interferring with the required release characteristics which the release must exhibit to effect transfer from a carrier to a receiving article. Consequently, the formulation of the present invention for heat transferable release layer 20 is believed to represent a considerable advance over prior art nonglossy-type heat transferable release coatings since applicant has been able to overcome all of the foregoing longstanding problems often associated with this type of heat transferable release coatings.

The improved release formulation 20 of the invention is a wax-based hot melt mix which contains a paraffin wax, modifier resin, and a binder adhesion-promoting resin.

The improved hot melt release 20 has a drop-melting point between about 85° C. to 135° C., more preferably a drop-melting point between about 95° C. to 105° C. This range in melting point contributes significantly to attainment of the desired release characteristics of the hot melt release during transfer of substrate 15 onto a receiving article which is accomplished at temperatures between about 300° F. to 600° F., preferably at temperatures between about 300° F. to 450° F., typically at 350° F. to 400° F. It has been determined that binder adhesion-promoting resins composed either of monoolefin/-vinylacetate acrylic acid terpolymer or monoolefin/e-thylacrylate copolyer when used in blend with a paraffin wax provides a release coating 20 having enhanced adhesive bonding and anchorage properties for ink design layer 30 or optional intermediate barrier coating layer 25. This is accomplished, surprisingly, without sacrificing the required release properties of coating 20. It has been determined that the aforesaid, improved adhesive and anchorage properties imparted by the binder adhesion-promoting resin have dramatically alleviated the longstanding problems of "coating crawl" during formation of the laminate and "shrinkage" during transfer to a receiving article. The inclusion of the binder/adhesive agent has also resolved the problem of coating "peel" apt to occur with prior art release formulations during unwind of the stored laminate roll prior to use.

A three-or-four-fold increase in the adhesive bonding strength of the ink or barrier layer coated onto release layer 20 is readily achievable by employing the binder adhesion-promoting resin of the present formulation in place of binders such as oxidized polyethylene resin conventionally employed in heat transferable wax-based release coatings having a matte, nonglossy appearance. The preferred binder adhesion-promoting resin which achieves this advance in the art is a thermoplastic resin selected from the class of terpolymers composed of a monoolefin/vinylacetate/acrylic acid terpolymer, in particular ethylene/vinylacetate/acrylic acid terpolymer. A preferred ethylene/vinylacetate/a-crylic acid terpolymer for use in the present formulation may be selected from the ELVAX 4000 series of such terpolymer resins. The ELVAX 4000 series resin in liquid phase has a Gardner Color Index of between about 0.5 to 4 (ASTM D-1544). A particularly suitable ethylene/vinylacetate/acrylic acid terpolymer is available under the ELVAX 4310 grade from DuPont Company of Wilmington, Del. ELVAX 4310 grade has a vinylacetate content of between about 24 to 26 weight percent and a melt index of between about 420 to 580. (Melt index is measured as grams/flow per 10 minutes at 44 psi and 190° C. in accordance with ASTM D-1238). The ELVAX 4000 series of resins are highly specialized terpolymer resins not to be confused with Elvax ethylene/vinylacetate copolymer resins. Applicant has determined that the latter copolymer resin is unsuitable for use in the matte, heat release formulation of the present invention.

An alternative thermoplastic binder adhesion-promoting resin which may be used in the present formulation for release layer 20 is a mono-olefin/ethyl acrylate copolymer, and in particular, an ethylene/ethyl acrylate copolymer. The latter copolymer is available commercially under the trade designation BAKELITE ethylene/ethyl acrylate copolymer DPDA-9169 available from the Union Carbide Company of Danbury, Conn. Suitable ethylene/ethylacrylate copolymers under the DPDA 6000 and 9000 series for use in the present invention have a melt index between about 1.5 to 5.0 (ASTM D-1238), and in liquid phase have a Gardner Color Number of less than 4, typically between 0.5 and 4 (ASTM D-1544).

Although acrylic acid (or acrylate formed therefrom) is a designated specific monomer for either of the above two types of preferred binder adhesion-promoting agents, it will be appreciated that higher homologs of acrylic acid may also provide suitable substitutes, in particular unsaturated carboxylic acids having a carbon content between about $C_3$ to $C_5$, particularly monounsaturated carboxylic acids having a carbon content between about $C_3$ to $C_5$. Also higher homologs of vinylacetate, in particular allyl acetate, may be a suitable substitute monomer for vinylacetate in the above-mentioned monoolefin/vinylacetate/acrylic acid terpolymer.

Applicants have determined that the desired properties of release coating 20 are further enhanced by including in the blend a thermoplastic modifier resin which is compatible with the binder adhesion-promoting component, and which significantly reduces the melt viscosity of the blend while simultaneously improving hardness of coating 20. This combination of properties has surprisingly helped to alleviate the problem of "shrinkage" of release coating 20 during transfer without retarding its release properties. A preferred modifier resin having this combination of properties is selected from the class of viscosity-modifier resins selected from polymers of α-olefins. Another such viscosity-modifier agent determined to have the above-described combination of properties is a low molecular weight polyethylene resin, which is a nonoxidized polyethylene homopolymer. Although either of these preferred modifier agents may desirably be used alone in the release formulation for coating 20 and the aforementioned improved results obtained thereby, it is even more advantageous to include in the formulation both species of preferred modifier agents in combination.

Thus, a preferred formulation includes a release component containing a paraffin wax and a binder adhesion-promoting resin, preferably selected from an ethylene/vinylacetate acrylic acid terpolymer or ethylene/ethyl acrylate copolymer. The properties of the formulation are improved by including a modifier agent. In particular, a modifier agent selected either from a α-olefin polymer or a nonoxidized low molecular weight polyethylene. Preferably, the modifier agent includes the combination of a α-olefin polymer and a nonoxidized low molecular weight polyethylene resin. It is also desirable to include a small amount of antioxidant, e.g. about 0.05 weight percent in the release formulation. A suitable antioxidant is a substituted phenolic derivative such as 2,6 di-tert-butyl 4-methylphenol available under the IONOL tradename, from Shell Chemical Company.

It has been determined that the improved hot melt formulation for release coating 20 advantageously has a drop melting point between about 85° C. to 135° C., more preferably a drop melting point between about 95° C. to 105° C. The above range in melting points significantly contributes to the attainment of desired release characteristics during transfer of substrate 15 onto an article which occurs preferably in a temperature range between about 300° F. to 450° F., preferably 350° F. to 400° F.

The paraffin wax component in the formulation for release 20 is used to give layer 20 its principal release characteristic upon melting. Paraffin wax is a petroleum-derived product, typically having a molecular weight between about 254 to 450, and is composed essentially of linear, saturated hydrocarbons ranging from $C_{18}H_{38}$ to $C_{32}H_{66}$. Paraffin wax typically has a melting point of about 110° F. to 175° F. Preferred paraffin wax for use in this formulation of the present invention is composed of substantially linear, saturated hydrocarbons ranging from $C_{26}H_{54}$ to $C_{32}H_{66}$, having a melting point between about 145° F. to 175° F. Paraffin waxes suitable for use in release layer 20 are available in various grades which differ chiefly in melting point. Commercial grade paraffin wax which may be used in release layer 20 is commonly designated as refined, semirefined, and crude grade waxes. Of these, the refined grade is preferred for use in the present formulation for release layer 20. Paraffin wax of a refined grade is obtainable from Sunoco Oil Company, Philadelphia, Pa.

The low molecular weight polyethylene resin which may be used as a suitable modifier resin in the present formulation has a molecular weight less than about 10,000, preferably less than 5,000, and is characterized in that it has a low melt viscosity. Low molecular weight polyethylene resins of this type have conventionally been used in the art of paraffin wax paper coatings such as that used in the food industry for household waxpaper. A very suitable polyethylene resin for use as a modifier for the paraffin wax-based formulation of the present invention is a nonoxidized polyethylene homopolymer having a softening point between about 200° F. to about 230° F., and a low melt viscosity in the range between about 180 cps to 6,000 cps as measured at about 140° C. (284° F.). The molecular weight of the preferred polyethylene resin is less than about 10,000, preferably less than about 5,000, and typically a molecular weight of about 1,500 to 2,000. A preferred series of nonoxidized polyethylene homopolymer resins particularly suitable as modifier agents in the present formulation are available under the trade designation A-C® polyethylene homopolymer resin 700 series available from the Allied Chemical Company, Fibers and Plastics Division of Morristown, N.J. Within this group, the preferred polyethylene homopolymer is an A-C® polyethylene homopolymer 712 available from Allied Chemical. This particular homopolymer has a softening point (ASTM E-28) of about 226° F., a penetrometer hardness of about 3.5 mm (ASTM D-1321), and a Brookfield viscosity of about 1500 cps at 140° C. (284° F.). Inclusion of a modifier agent containing a polyethylene homopolymer of low molecular weight and low melt viscosity imparts greater hardness of the paraffin component, as well as improved resistance to abrasion. It has surprisingly also helped to alleviate the problem of release coating and image shrinkage of transfer to a receiving article.

Another preferred modifying agent having properties similar to that of polyethylene homopolymer and exhibiting rather low melt viscosity and a high penetrometer hardness is selected from the α-olefin polymer class. These polymers include polymers of polyethylene and generally include higher olefins wherein the double bond is located at the end of the monomer chain. Therefore, polymers of α-olefins include polymers of propylene, 1-butene, 1-pentene, and higher polymers such as those of 4-methyl pentene-1. The designation of α-olefin polymers includes copolymers of α-olefins with other monomers, and in particular with ethylene. Applicants have determined that a particularly suitable α-olefin polymer-modifier resin is available in the form of a synthetic white petroleum wax under the trade designation ALOF 0604 from the Durachem Company, an affiliated company of Astra Chemical Ltd., United Kingdom.

The ALOF 0604 α-olefin polymer has a melting point between about 82° C. to 90° C. and a penetrometer hardness at 25° C. of between about 10 to 15 mm (ASTM D-1321-57T). The above-mentioned class of polyethylene homopolymer of α-olefin in liquid phase has a Gardner Color Index of between about 0.5 to 4.

Preferred compositions for release layer 20 are shown in Table I. Although specific formulations for release layer 20 are given in Table I, it has been determined that the paraffin wax may be present in the release layer 20 in an amount between about 10 to 50 weight percent, preferably between about 25 to 30 weight percent. The weight ratio of the binder adhesion-promoting resin to is preferably in a range between about 0.5/1 to 2/1. The total amount of modifier resins present are in amounts typically between about 40 to 85 weight percent. The weight ratio percent of α-olefin to nonoxidized polyethylene homopolymer resins is typically in a range between about 0.5/1 to 2/1.

TABLE 1

| FORMULATION | A Wt. % | B Wt. % | C Wt. % | D Wt. % | E Wt. % |
|---|---|---|---|---|---|
| Released Component | | | | | |
| Paraffin Wax | 28.8 | 27.4 | 26.2 | 28.8 | 27.4 |
| Binder Adhesion-Promoting Resin | | | | | |
| Ethylene/Vinyl-acetate/Acrylic Acid Terpolymer e.g. ELVAX 4310 | 5.2 | 9.8 | 14.0 | | |
| Ethylene/Ethyl-acrylate Copolymer e.g. BAKELITE DPDA-9169 | | | | 5.2 | 9.8 |
| Modifier Resin | | | | | |
| α-Olefin Polymer e.g. ALOF-0604 | 28.8 | 27.4 | 26.2 | 28.8 | 27.4 |
| Polyethylene Homopolymer Resin (Non-oxidized) e.g. AC-712 | 37.1 | 35.4 | 33.6 | 37.1 | 35.4 |
| Antioxidant | | | | | |
| Substituted Phenolic Derivative e.g. IONOL | (0.05) | (0.05) | (0.05) | (0.05) | (0.05) |
| TOTALS | 100.0 | 100.0 | 100.0 | 100.0 | 100.0 |

Any of the formulations of Table I can be prepared by adding the listed components in the proportions shown to a suitable heating vessel and stirring therein at a temperature between about 250° F. to 300° F. until a homogeneous hot melt mixture has been obtained.

The hot melt release 20 is coated preferably by extrusion coating methods onto carrier 10 in any desired size and pattern, preferably over a surface of the entire carrier sheet. Release layer 20 is coated to a weight which is in the range between about 2.7 to 4.5 lbs. per ream (20 in.×25 in.×500 sheets per ream). The hot melt release 20 is coated at a melt temperature typically between 250° F. to 300° F.

After coating release layer 20 onto carrier 10, which is typically a paper sheet, the coating quickly becomes solidified upon exposure to a water-cooled roller. Upon solidification of release layer 20, the ink design layer 30 is then applied over the release layer. Prior to applying ink design layer 30 it is optional, though preferable, to coat the release 20 with a lacquer-barrier coating 25. A wide variety of lacquer-based barrier coatings are available, but a preferred barrier coating contains a linear-multiaromatic acid-based polyester resin, for example such as that available under the trade designation VITEL PE-200 or VITEL PE-222 available from Goodyear Company of Aberon, Ohio. The lacquer is formed by solubilizing the resin in suitable solvent, such as toluene or methylethyl ketone. The use of a barrier-lacquer coating 25 enhances the protective properties of release coating 20 after the substrate 15 has been transferred onto a receiving article. Thus, barrier coating 25, if employed, further protects the transferred ink design layer 30 from chemical corrosion, such as the activity of alcohol spillage or detergent spillage, on the surface of the transferred label. Lacquer-barrier label 25, if desired, may be coated onto release layer 20 by use of conventional coating techniques such as castcoating, particularly reverse-roller coating, letterpress, and flexographic techniques. However, a preferred coating technique is by gravure.

Ink design layer 30 is applied preferably so that the release layer 20 extends beyond the design layer. Ink design layer 30 may be coated by conventional coating techniques, such as reverse-roll coating, letterpress, and flexographic techniques, but the gravure method is preferred. Ink design layer 30 may be composed of any conventional ink of any color. The ink may typically include resinous binder bases compatible with the ink pigment employed. The ink binder may be selected from a wide variety of conventional resinous bases such as polyamide, polyvinylchloride, acrylics, and polyamide nitrocellulose.

Ink layer 30 is preferably overlaid with an adhesive coating 40, which facilitates transfer of substrate 15 to the article to be decorated. In this case, substrate 15 may therefore typically be composed of release layer 20, ink design layer 30, and adhesive layer 40 as illustrated in FIG. 2, and may optionally include a lacquer-barrier layer 25 as illustrated in FIG. 3. Adhesive layer 40 may suitably be composed of a thermoplastic polyamide adhesive. A preferred thermoplastic polyamide adhesive is the reaction product of a diamine with a dimerized fatty acid such as that available under the tradename VERSAMID 900 series from Henkel Corp. of Minneapolis, Minn. In forming adhesive layer 40, it is advantageous to combine the polyamide component with a nitrocellulose base. Conventional coating techniques, such as gravure and other castcoating techniques, particularly reverse-roll coating, may be employed in order to coat adhesive layer 40.

Although the invention has been described within the context of particular embodiments for the transferable substrate, the invention is not intended to be limited to any particular composition or layer structure for the transferable substrate. It is known that the transferable substrate may contain other coating layers, for example, a plurality of ink design layers or a plurality of lacquer-barrier-type layers between the ink design layer and the release layer. The invention is equally applicable to such varying heat transferable substrates. The invention is also applicable to heat transferable laminates wherein adhesive components are added to the ink design layer itself thereby obviating the need for a separate adhesive coating layer. It should be appreiated, therefore, that the release formulation of the invention has a wide application as a release coating for any heat transferable substrate in contact with a support member such as a carrier web wherein a matte, nonglossy appearance is desired for the transferred image. The invention, therefore, is not intended to be limited to the description in the specification, but rather is defined by the claims and equivalents thereof.

I claim:

1. In a heat transferable laminate of the type including a carrier support and a heat transferable substrate comprising a release layer in contact with the carrier support, and an ink design layer, said substrate being transferable from the carrier support to a receiving article upon application of heat to the carrier while said receiving article contacts the transferable substrate, an improved release layer, comprising:

a wax component; and a binder resin comprising a thermoplastic acrylic-based terpolymer resin selected from the group consisting of a monoolefin/vinyl acetate/acrylic acid terpolymer and a monoolefin/allyl acetate/acrylic acid terpolymer, the improved release having a drop melting point between about 85° C. to 135° C., permitting transfer at between about 300° F. and 600° F. in less than 2 seconds and resolidifying after transfer to provide a transparent, matte, nonglossy, protective coating.

2. A heat transferable laminate as in claim 1 wherein the binder resin in liquid phase has a Color Gardner Index of less than about 4.

3. A heat transferable laminate as in claim 1 wherein the improved release layer permits transfer of said substrate containing said ink design layer at transfer temperatures between about 300° F. to 600° F.

4. A heat transfer laminate as in claim 3 wherein the release layer permits said transfer to occur within said transfer temperature range in a period less than about 2 seconds.

5. A heat transfer laminate as in claim 3 wherein the release layer permits said transfer to occur within said transfer temperature range in a period between about 0.1 and 2 seconds.

6. A heat transfer laminate as in claim 1 wherein the improved release layer further comprises a thermoplastic modifier resin comprising a nonoxidized polyethylene homopolymer having an average molecular weight of less than about 10,000.

7. A heat transferable laminate as in claim 6 wherein the nonoxidized polyethylene homopolymer has an average molecular weight between about 1,500 and 5,000.

8. A heat transferable laminate as in claim 1 wherein the improved release layer further comprises a thermoplastic modifier resin comprising an α-olefin polymer.

9. A heat transferable laminate as in claim 8 wherein the α-olefin polymer is selected from the group consisting of polymers of propylene, 1-butene, 1-pentene, and 4-methyl pentene-1.

10. A heat transferable laminate as in claim 1 wherein the wax component is a paraffin wax.

11. A heat transferable laminate as in claim 10 wherein the paraffin wax is a substantially linear, saturated paraffin wax having a melting point between about 110° F. to 175° F.

12. A heat transferable laminate as in claim 10 wherein the paraffin wax comprises between about 10 to 50 percent by weight of the improved release layer.

13. A heat transferable laminate as in claim 12 wherein the weight ratio of the binder adhesion-promoting resin to paraffin wax is between about 0.5/1 to 2/1.

14. A heat transferable laminate as in claim 1 wherein said article is a nonfibrous material.

15. A heat transferable laminate as in claim 14 where said article is a nontransparent, plastic.

16. In a heat transferable laminate of the type including a carrier support and a heat transferable substrate comprising a release layer in contact with the carrier support, and an ink design layer, said substrate transferable from the carrier support to a receiving article upon application of heat to the carrier while said receiving article contacts the transferable substrate, an improved release layer comprising:

a paraffin wax; and a binder resin comprising a mono-olefin/ethyl acrylate copolymer, the improved release having a drop melting point between about 85° C. to 135° C., permitting transfer of said heat transferable substrate at transfer temperatures between about 300° F. to 600° F. in a period less than about 2 seconds, and resolidifying after transfer to provide a transparent, matte, nonglossy, protective coating.

17. A heat transferable laminate as in claim 16 wherein the improved release layer further comprises a thermoplastic modifier resin selected from the group of olefin polymers consisting of nonoxidized polyethylene homopolymer of molecular weight less than about 10,000 and and α-olefin polymer.

18. A heat transferable laminate as in claim 16 wherein the binder resin comprises ethylene/ethyl acrylate copolymer.

19. In a heat transferable laminate of the type including a carrier support and a heat transferable substrate comprising a release layer in contact with the carrier support, and an ink design layer, said substrate being transferable from the carrier support to a receiving article upon application of heat to the carrier while said receiving article contacts the transferable substrate, an improved release layer, comprising:

a paraffin wax component; and a binder resin comprising a thermoplastic acrylic-based terpolymer selected from the group consisting of a monoolefin/vinyl acetate/carboxylic acid terpolymer and a monoolefin/allyl acetate/carboxylic acid terpolymer, wherein the carboxylic acid is a monounsaturated carboxylic acid having a carbon content between about $C_3$ and $C_5$, the improved release having a drop melting point between about 85° C. to 135° C., permitting transfer at between about 300° F. and 600° F. in less than 2 seconds and resolidifying after transfer to provide a transparent, matte, nonglossy, protective coating.

20. A heat transferable laminate as in claim 19 wherein the improved release layer further comprises a thermoplastic modifier resin selected from the group of olefin polymers consisting of nonoxidized polyethylene homopolymer of molecular weight less than about 10,000 and an alpha-olefin polymer.

* * * * *